(12) United States Patent
Huang et al.

(10) Patent No.: US 11,494,215 B2
(45) Date of Patent: Nov. 8, 2022

(54) TECHNIQUES TO DECREASE A LIVE MIGRATION TIME FOR A VIRTUAL MACHINE

(71) Applicant: Intel Corporation, Santa Clara, CA (US)

(72) Inventors: Peng Huang, Shanghai (CN); Liang Li, Shanghai (CN); Xiaofeng Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 16/490,474

(22) PCT Filed: Mar. 31, 2017

(86) PCT No.: PCT/CN2017/078941
§ 371 (c)(1),
(2) Date: Aug. 30, 2019

(87) PCT Pub. No.: WO2018/176359
PCT Pub. Date: Oct. 4, 2018

(65) Prior Publication Data
US 2021/0406050 A1    Dec. 30, 2021

(51) Int. Cl.
*G06F 9/455* (2018.01)
*G06F 9/48* (2006.01)
*G06F 12/109* (2016.01)

(52) U.S. Cl.
CPC ........ *G06F 9/45558* (2013.01); *G06F 9/4856* (2013.01); *G06F 12/109* (2013.01); *G06F 2009/45583* (2013.01); *G06F 2009/45595* (2013.01); *G06F 2212/151* (2013.01)

(58) Field of Classification Search
None
See application file for complete search history.

(56) References Cited

U.S. PATENT DOCUMENTS

| 9,086,981 B1 | 7/2015 | Tati et al. |
| 9,552,233 B1 * | 1/2017 | Tsirkin .................. G06F 9/5016 |
| 2014/0366027 A1 | 12/2014 | Tsirkin |

FOREIGN PATENT DOCUMENTS

CN    103049308 A    4/2013

OTHER PUBLICATIONS

AMD; AMD I/O Virtualization Technology (IOMMU) Specification Rev 3.00, Dec. 2016 (Year: 2016).*
International Search Report and Written Opinion for PCT Patent Application No. PCT/CN2017/078941, dated Jan. 9, 2018, 12 pages.

* cited by examiner

*Primary Examiner* — Bing Zhao
(74) *Attorney, Agent, or Firm* — Compass IP Law PC

(57) ABSTRACT

Examples may include techniques to decrease a live migration time for a virtual machine (VM). Examples include selecting data to copy or not copy during a live migration of the VM from a source host server to a destination host server.

19 Claims, 13 Drawing Sheets

800

```
START DIRTY PAGE LOGGING RESPONSIVE TO INITIATION OF A LIVE
MIGRATION OF A VM SUPPORTED BY A FIRST HOST SERVER TO A SECOND
HOST SERVER, THE DIRTY PAGE LOGGING STARTED TO TRACK WHAT
MEMORY PAGES FOR MEMORY ALLOCATED TO THE VM FOR EXECUTION OF
ONE OR MORE APPLICATIONS BECOME DIRTY WHILE DETERMINING WHAT
DATA IS TO BE COPIED FROM THE MEMORY ALLOCATED TO THE VM FOR
COMPLETION OF THE LIVE MIGRATION
802
```

```
SEND A REQUEST TO THE VM FOR THE VM TO CONSTRUCT A FREE PAGE
BITMAP THAT IDENTIFIES WHICH MEMORY PAGES OF THE MEMORY PAGES
FOR MEMORY ALLOCATED TO THE VM HAVE BECOME FREE FOLLOWING
INITIATION OF THE LIVE MIGRATION
804
```

```
RECEIVE THE FREE PAGE BITMAP AND FILTERING OUT FREED MEMORY
PAGES FROM A DIRTY PAGE BITMAP THAT IDENTIFIES THE DATA TO BE
COPIED FROM THE MEMORY ALLOCATED TO THE VM FOR COMPLETION
OF THE LIVE MIGRATION
806
```

```
SYNCHRONIZE THE DIRTY PAGE BITMAP WITH THE DIRTY PAGE LOGGING
TO DETERMINE THE DATA TO COPY FROM THE MEMORY ALLOCATED TO
THE VM TO COMPLETE THE LIVE MIGRATION
808
```

FIG. 8

Storage Medium 900

Computer Executable Instructions for 800

RECEIVE ONE OR MORE GVAs FOR STORING DATA ASSOCIATED WITH EXECUTION OF AN APPLICATION BY A VM SUPPORTED BY A FIRST HOST SERVER, THE DATA STORED TO THE ONE OR MORE GVAs IDENTIFIED AS DATA NOT TO BE COPIED DURING LIVE MIGRATION OF THE VM TO A SECOND HOST SERVER
1102

TRANSLATE THE ONE OR MORE GVAS TO RESPECTIVE ONE OR MORE GPAs FOR MEMORY ALLOCATED TO THE VM
1104

DETERMINE A GPA START ADDRESS AND MEMORY REGION SIZE FOR THE ONE OR MORE GPAs
1106

INVOKE AN INSTRUCTION THAT INCLUDES THE GPA START ADDRESS AND MEMORY REGION SIZE RESPONSIVE TO RECEIVING AN INDICATION OF A START OF THE LIVE MIGRATION OF THE VM TO THE SECOND HOST SERVER, THE INSTRUCTION TO CAUSE ONE OR MORE DIRTY FLAGS OF AN EXTENDED PAGE TABLE THAT MAPS THE ONE OR MORE GPAs TO CORRESPONDING ONE OR MORE HPAs TO BE CLEARED SUCH THAT DATA STORED AT THE CORRESPONDING HPAs IS NOT COPIED DURING THE LIVE MIGRATION
1108

FIG. 11

Storage Medium 1200

Computer Executable Instructions for 1100

FIG. 12

TECHNIQUES TO DECREASE A LIVE MIGRATION TIME FOR A VIRTUAL MACHINE

PRIORITY

This application is a U.S. National Phase application under 35 U.S.C. § 371 of International Application No. PCT/CN17/78941 filed Mar. 31, 2017 entitled "TECHNIQUES TO DECREASE A LIVE MIGRATION TIME FOR A VIRTUAL MACHINE", the entire contents of which are incorporated herein by reference.

TECHNICAL FIELD

Examples described herein are generally related to virtual machine (VM) migration between nodes, servers or computing platforms in a network.

BACKGROUND

Live migration for virtual machines (VMs) hosted by nodes, servers or computing platforms is an important feature for a system such as a data center to enable fault-tolerance capabilities, flexible resource management or dynamic workload rebalancing. Live migration may include migrating a VM hosted by a source host server to a destination host server over a network connection between the source and destination host servers. The migration may be considered as live since one or more applications being executed by the migrated VM may continue to be executed by the VM during the live migration.

BRIEF DESCRIPTION OF THE DRAWINGS

FIG. 8 illustrates an example of a first logic flow.
FIG. 9 illustrates an example of a first storage medium
FIG. 11 illustrates an example of a second logic flow.
FIG. 12 illustrates an example of a second storage medium.

DETAILED DESCRIPTION

Figure 1:
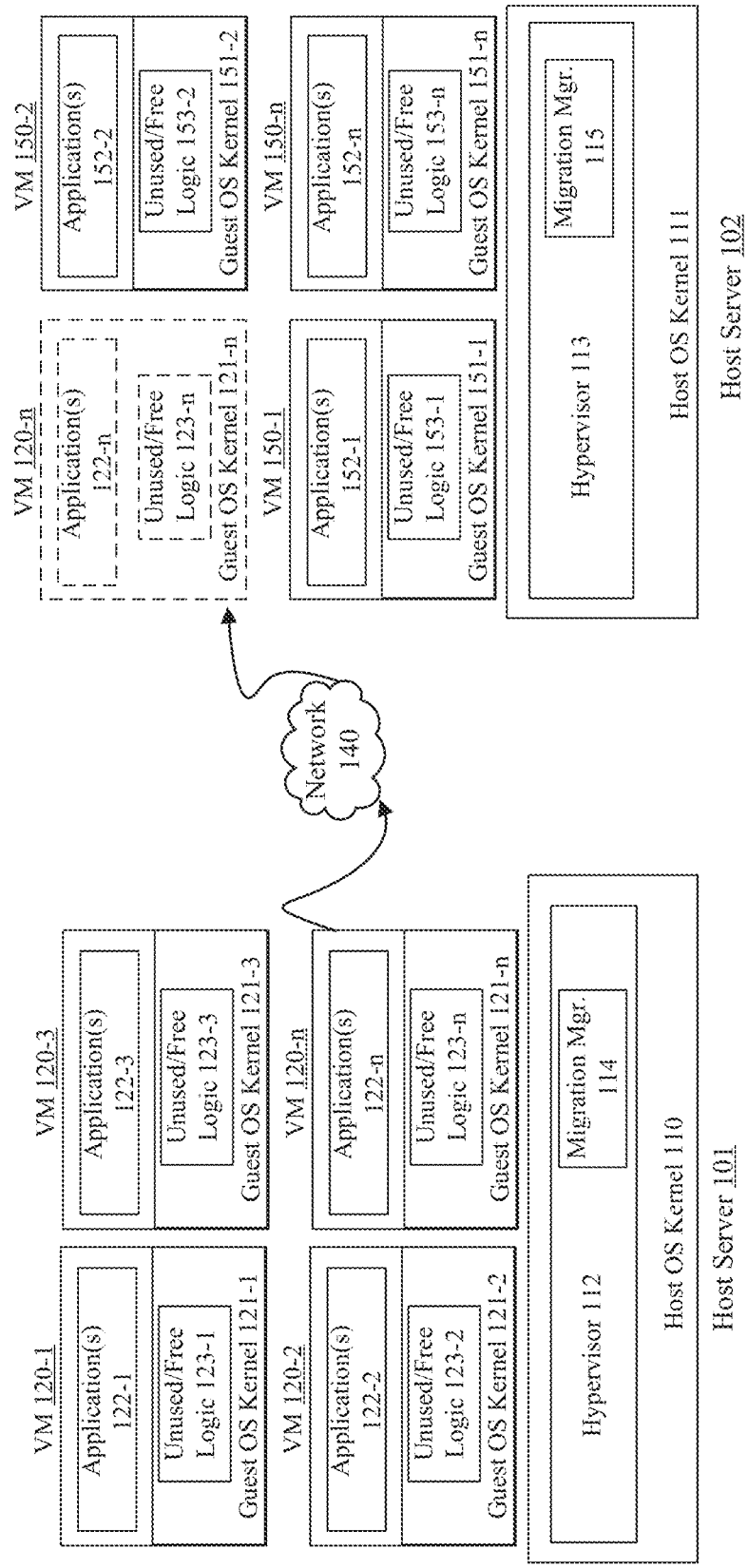
FIG. 1 illustrates an example system.

As contemplated in the present disclosure, live migration of a VM from a source host server to a destination host server may be considered as live as an application and/or guest operating system (OS) kernel being executed by the VM may continue to be executed by the VM during almost all of the live migration. Typically, VM hypervisors or VM managers (VMM) separately supported by respective source/destination host servers may be arranged to coordinate live migration of VMs between host servers. Live migration may involve a tremendous amount of memory copies that may consume a relatively large amount of central processing unit (CPU) resources as wells as network bandwidth. In some examples, limited compute and/or network bandwidth resource provided for live migration may result in a live migration taking an unacceptably long time to complete. This unacceptably long time to complete a live migration may consequently introduce notable interruptions of services assigned to VM being migrated and may even negatively affect other non-migrated VMs on source and/or destination host servers.

A large portion of a live migration of a VM may be VM state information that includes memory used by the VM while executing one or more applications. Therefore, live migration typically involves a two-phase process. A first phase may be a pre-memory copy phase that includes copying memory allocated to a VM for executing one or more applications and changing allocated memory (e.g., dirty pages) from the source host server to the destination host server while the VM is still executing the one or more applications or the VM is still running on the source host server. The first or pre-memory copy phase may continue until remaining dirty pages at the source node fall below a threshold. The second phase may then be a stop-and-copy phase that stops or halts the VM at the source host server, copies remaining state information (e.g., remaining dirty pages and/or processor state, input/output state) to the destination host server, and then quickly resumes the VM at the destination host server. The copying of information for the two phases may be through a network connection maintained between source and destination host servers.

The amount of time spent in the second, stop-and-copy phase is important as the application is not being executed by the VM for this period of time. Thus, any services being provided while executing the application may be temporarily unresponsive. The amount of time spent in the first pre-memory copy phase is also important since this phase may have the greatest time impact on the overall time to complete the live migration.

A significant challenge to live migration may be an amount of a memory allocated to a VM as the VM executes one or more applications. Typically, a dirty page bitmap may include all used, unused or freed memory pages allocated to the VM. A dirty page bitmap that includes all used, unused or freed memory may cause an unnecessarily large amount of allocated memory to be copied during live migration. If the amount of allocated memory to be copied for a live migration is too large, then limited CPU and/or network bandwidth resources allocated for the live migration may result in an unacceptably long time to complete the live migration. This unacceptably long time is problematic to live migration and may lead to a migration failure. It is with respect to these challenges that the examples described herein are needed.

FIG. 1 illustrates an example system 100. In some examples, as shown in FIG. 1, system 100 includes a host server 101 coupled through a network 140 with a host server 102. For these examples, network 140 may be part of an internal network that communicatively couples host server 101 with various other host servers or nodes that includes host server 102. These interconnected host servers or nodes may be part of a data center providing network services to one or more clients or customers. For example, host server 101 may be a node or server in a data center having a plurality of interconnected nodes/servers that may be arranged to provide Infrastructure as a Service (IaaS), Platform as a Service (PaaS) or Software as a Service (SaaS) services for one or more clients or consumers of these types of cloud-based services.

According to some examples, host server 101 and host server 102 may be host nodes or host servers separately capable of hosting a plurality of VMs such as VM 120-1 to VM 120-n at source host server 101 or VMs 150-1 to 150-3 at destination host server 102, where "n" may represent any whole positive integer greater than 1. Hosting may include providing composed physical resources (not shown) such as processors, memory, storage or network resources maintained at or accessible to a given host server or node.

In some examples, as shown in FIG. 1, host server 101 may have a host operating system (OS) kernel 110. Host OS kernel 110 may be arranged to implement a virtual machine manager (VMM) or hypervisor 112. Hypervisor 112 may be configured to manage various operations and/or configurations for VMs hosted by host server 101. Also, as shown in FIG. 1, guest OS kernels 121-1 to 121-n of respective VMs 120-1 to 120-n may each support an executing environment for at least one VM. For these examples, VMs 120-1 to 120-n may be separately arranged to run one or more respective applications 122-1 to 122-n.

According to some examples, as shown in FIG. 1 and similar to host server 101, host server 102 may have a host OS kernel 111. Host OS kernel 111 may be arranged to implement a VMM or hypervisor 113. Hypervisor 113 may be configured to manage various operations and/or configurations for VMs hosted by host server 102. Also, as shown in FIG. 1, guest OS kernels 151-1 to 151-n of respective VMs 150-1 to 150-n may each support an executing environment for at least one VM. For these examples, VMs 150-1 to 150-n may be separately arranged to run one or more respective applications 152-1 to 152-n.

In some examples, a VM such as VM 120-n may be selected for a live migration from host server 101 to host server 102. Selection for live migration may be based on a multitude of factors including, but not limited to, load balancing of workloads serviced by applications executed by VMs hosted by host server 101. For example, workloads serviced by applications executed by VMs 120-1 to 120-n may be straining composed physical resources at host server 101 such that a VM needs to be migrated to another host server. In some examples, host server 102 may either host VMs executing applications servicing workloads requiring fewer composed physical resource or host server 123 may have more available composed physical resources and thus may be a desirable destination host server for a live migration of VM 120-n. A given workload executed by a VM, for example, may be a network service associated with providing IaaS, PaaS or SaaS to one or more clients of a data center that may include system 100.

According to some examples, logic and/or features of a VMM or hypervisor at a source host server such as migration logic 114 of host server 101 may coordinate with logic and/or features of a VM selected for live migration such as VM 120-n. For these examples, the logic and/or features of VM 120-n to coordinate with migration logic 114 may include unused/free logic 123-n of guest OS kernel 121-1. As described in more detail later, logic and/or features of a hypervisor or guest OS kernel may exchange information that may reduce an amount of data to be copied during a live migration of a VM such as VM 120-n from a source host server such as host server 101 to a destination host server such as host server 102. Also, logic and/or features of hypervisor 113 at host server 102 such as migration logic 115 may facilitate the live migration of VM 120-n to host server 102.

Figure 2:
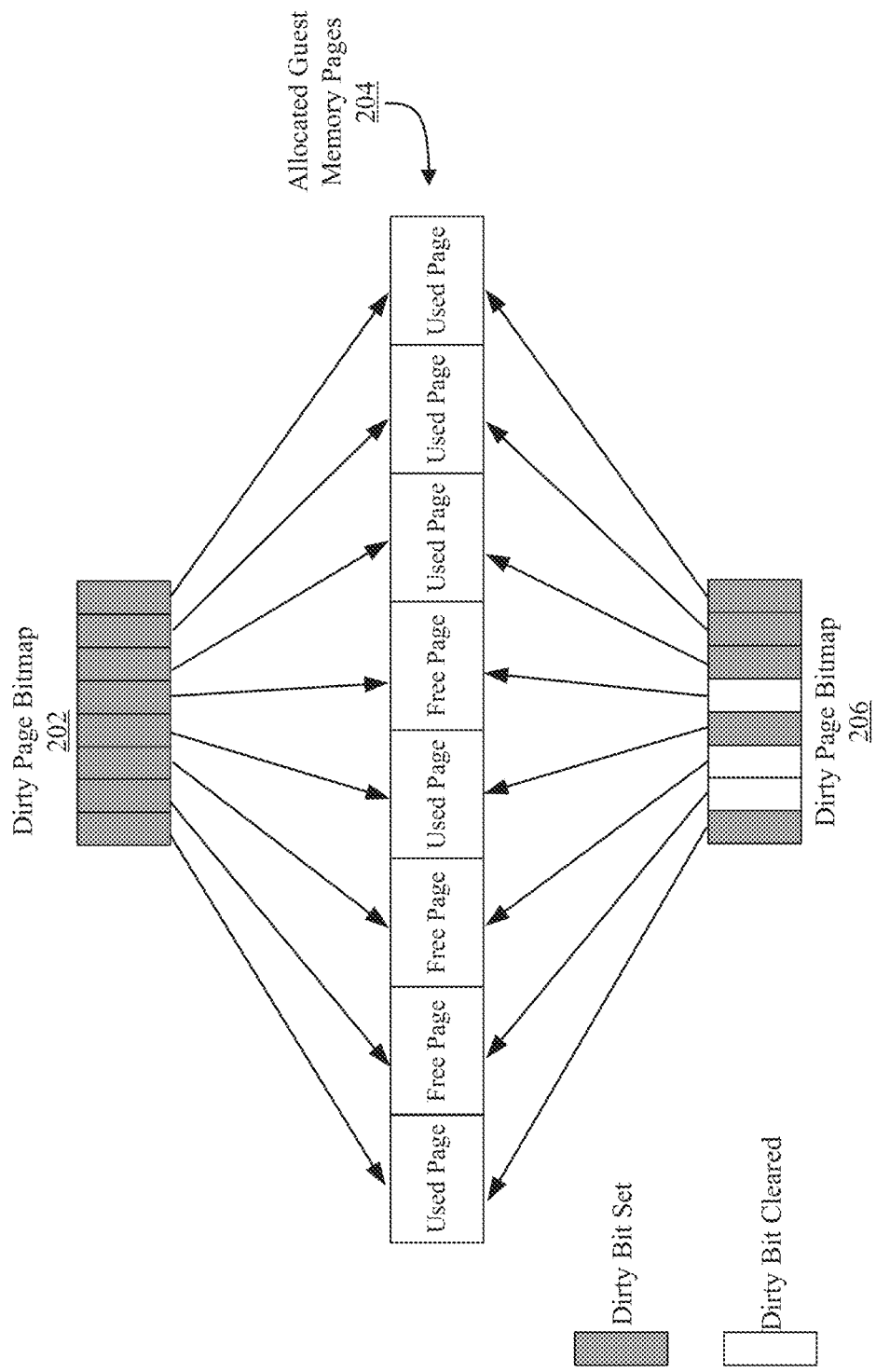
FIG. 2 illustrates an example comparison of two dirty page bit maps.

FIG. 2 issues an example comparison 200. As shown in FIG. 2, comparison 200 includes a comparison of a first dirty page bitmap 202 to a second dirty page bitmap 206. In some examples, dirty page bit map 202 may represent a group of bits set to indicate dirty memory pages that are copied during a live migration of a VM. For these examples, dirty page bitmap 202 has all dirty bits set to indicate that all guest allocated memory pages 204 are to be copied during a live migration of the VM. Allocated guest memory pages 204, for example, may be memory pages associated with guest physical pages allocated to the VM to execute one or more applications at a time the live migration was initiated. By comparison, dirty page bitmap 206 only has selected dirty bits set to indicate only a portion of allocated guest memory pages 204 are to be copied during a live migration of the VM.

According to some examples, as shown in FIG. 2, allocated guest memory pages 204 include both used and free pages. For these examples, used pages may include useful information that needs to be copied during a live migration of the VM. In other words, used pages include useful dirty pages that need to be copied to ensure the VM successfully migrates to a destination host server. Free pages may include memory pages that have been previously dirty but became freed following initiation of a live migration and do not need to be copied to ensure the VM successfully migrates to the destination host server.

In some examples, if dirty page bitmap 202 is used, then data included in several free pages would be copied during a live migration. However, if dirty page bit map 206 is used, the free pages are not marked for copying during a live migration and this results in a reduction in the amount of data copied during the live migration compared to data copied responsive to use of dirty page bitmap 202. As described more below, logic and/or features of a hypervisor (e.g., migration logic 114 of hypervisor 112) may coordinate with logic and/or features of a guest OS kernel (e.g., unused/free logic 123) to identify free pages included in guest memory pages allocated to a VM in order to create a dirty page bitmap similar to dirty page bitmap 206 that eliminates unnecessary copying of free pages during live migration.

Figure 3:
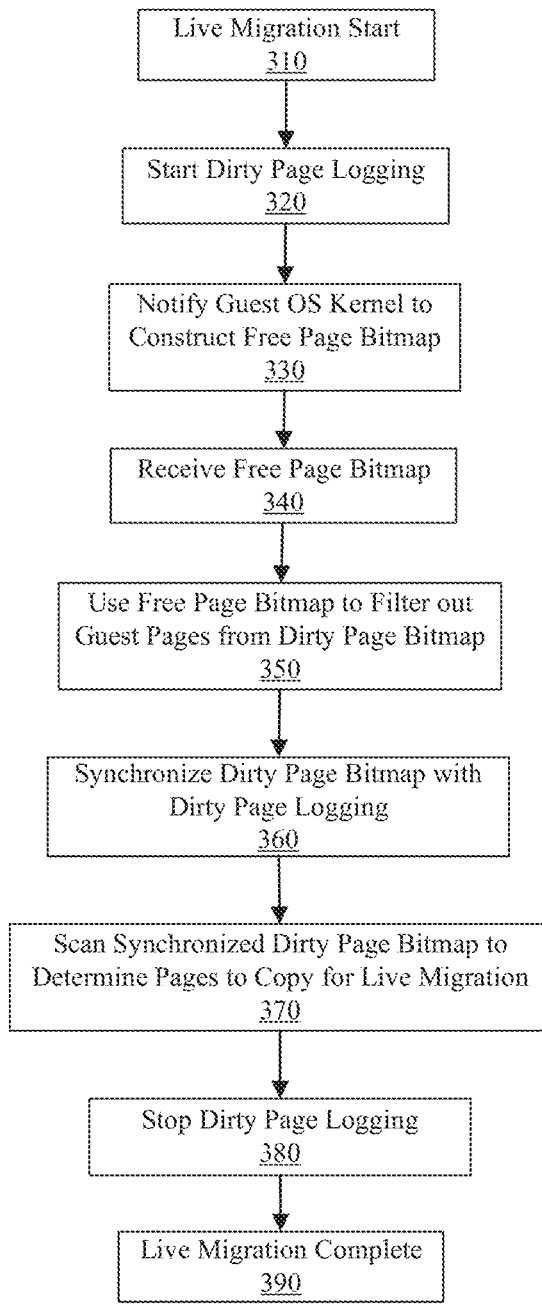
FIG. 3 illustrates an example process.

FIG. 3 illustrates an example process 300. In some examples, process 300 may depict a process to create a dirty page bitmap that attempts to reduce an amount of data copied from allocated guest memory pages for a VM being live migrated to a destination host server. For these examples, elements of system 100 such as, but not limited to, hypervisor 112, migration logic 114, guest OS kernel 121 or unused/free logic 123 may be associated with and/or may implement at least portions of process 300. Although examples are not limited to elements of system 100 being associated with and/or implementing at least portions of process 300.

Beginning at 310, logic and/or feature of hypervisor 112 such as migration logic 114 may initiate or start a live migration of a VM from among VMs 120-1 to 120-n. For example, VM 120-n may be selected for a live migration from host server 101 to host server 102. As part of that live migration, data stored to allocated guest memory pages that are needed to enable application(s) 122-n to continue to be executed by VM 120-n are to be copied and transmitted via network 140 in a manner such that VM 120-n can resume execution of applications(s) 122-n with little to no interruptions.

Moving to 320, migration logic 114 may start or initiate dirty page logging. Dirty page logging may track what allocated guest memory pages have become dirty during the process of completing a dirty page bitmap that may determine what data is to be copied to memory maintained at host server 102 (e.g., via network 140) for completion of the live migration to host server 102.

Moving to 330, migration logic 114 may notify guest OS kernel 121-1 to construct a free page bitmap. In some examples, the free page bitmap may indicate which pages of allocated guest memory pages are free. Free pages may include guest memory pages that have been previously dirty but became free following initiation of the live migration by migration logic 114. These free pages do not need to be copied to ensure that VM 120-1 successfully migrates to host server 102 in a manner that allows VM 120-1 to resume execution of application(s) 122-n at host server 102 with little to no interruptions.

Moving to 340, migration logic 114 may receive the free page bitmap constructed by logic and/or features of guest OS kernel 121-1 such as unused/free logic 123-1.

Moving to 350, migration logic 114 may use the received free page bitmap to filter out allocated guest memory pages from a dirty page bitmap. The dirty page bitmap, after filtering out allocated guest memory pages identified as free, may be similar to dirty page bitmap 206 shown in FIG. 2. In other words, identified free guest memory pages associated with bits marked in the dirty page bitmap are either removed from the dirty page bitmap or the bits are cleared to indicate these free guest memory pages are not to be copied during the live migration of VM 122-n.

Moving to 360, migration logic 114 may synchronize the dirty page bitmap with the dirty page logging to identify possible allocated guest memory pages that may have become dirty during the process of unused/free logic 123-1 constructing the free page bitmap. Migration logic 114 may receive and use the free page bitmap to filter the dirty page bitmap.

Moving to 370, the synchronized dirty page bitmap may then be scanned by migration logic 114 to determine which allocated guest memory pages are to be copied for live migration of VM 122-n to host server 102. In some examples, those guest memory pages associated with set dirty bits are to be copied while those guest memory pages associated with cleared dirty bits are not copied.

Moving to 380, migration logic 114 stops dirty page logging.

Moving to 390, live migration is complete. Process 300 then comes to an end.

Figure 4:
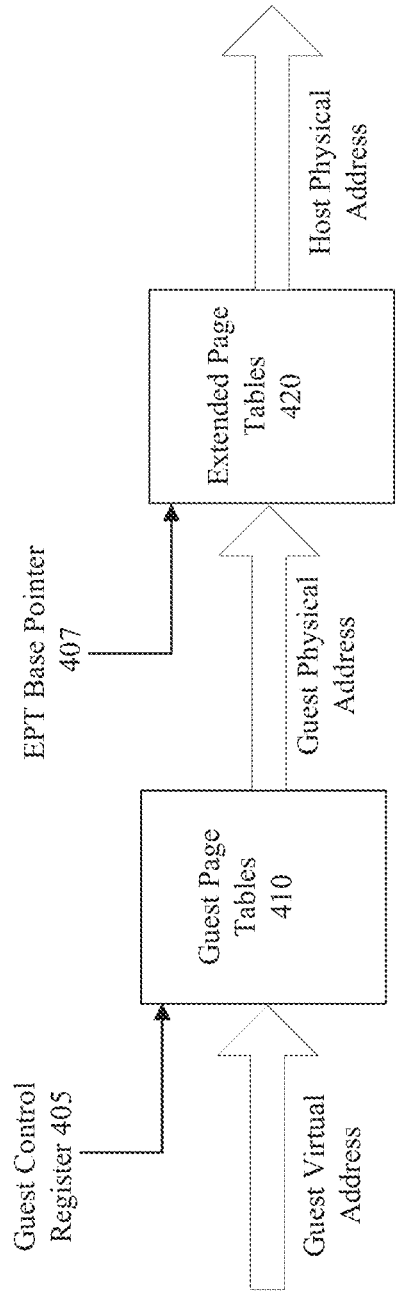
FIG. 4 illustrates an example first scheme

FIG. 4 illustrates an example scheme 400. In some examples, scheme 400 may depict an example of use of extended page tables to translate guest physical addresses to host physical addresses. Scheme 400 may be applicable to types of virtualization technology implemented on X86 CPU platforms such those designed by Intel® Corporation. These types of virtualization technology may utilize a memory management unit (MMU) to provide performance gains when VMs are executing applications having memory-intensive workloads. An MMU may be utilized to translate guest physical addresses to host physical addresses.

In some examples, some VM functions working in collaboration with an MMU support a CPU or X86 instruction known as extended page table pointer (EPTP) switch ("VMFUNC #0"). The X86 instruction of VMFUNC #0 allows software in a VM (e.g., a guest OS kernel) to load a new value for the EPTP and thereby establish a different EPT paging-structure hierarchy.

According to some examples, a different X86 instruction of VMFUNC #1 may allow a guest OS kernel of a VM to indicate which memory region of guest physical addresses allocated to a VM are unused and are not to be copied during a live migration of the VM to a destination host server or node. For these examples, VMFUNC #1 may allow for a dirty flag in the EPT associated with the unused memory region to be cleared by an invoking guest OS kernel. As described more below, a hypervisor including logic and/or features to facilitate migration of the VM (e.g., a migration manager) may update a dirty page bitmap for host physical addresses (e.g., translated from guest physical addresses by an MMU) to skip copying of those memory regions having cleared dirty flags in the EPT.

According to some examples, as shown in FIG. 4, a guest virtual address may map to guest page tables 410. For these examples, logic and/or features of a guest OS kernel (e.g., unused/free logic) for a VM may provide a value for guest control register 405 and a value for EPT base pointer 407 to cause an MMU for a CPU to translate a guest physical address of memory allocated to a VM to execute one or more applications to a host physical address. As described more below, the guest OS kernel may invoke VMFUNC #1 to cause this type of translation in order cause one or more dirty flags in one or more EPTs such as extended page tables 420 to be cleared. The one or more dirty flags may be cleared based on whether one or more regions of the memory allocated to the VM are unused and are not to be copied during live migration of the VM to a destination host server or node.

Figure 5:
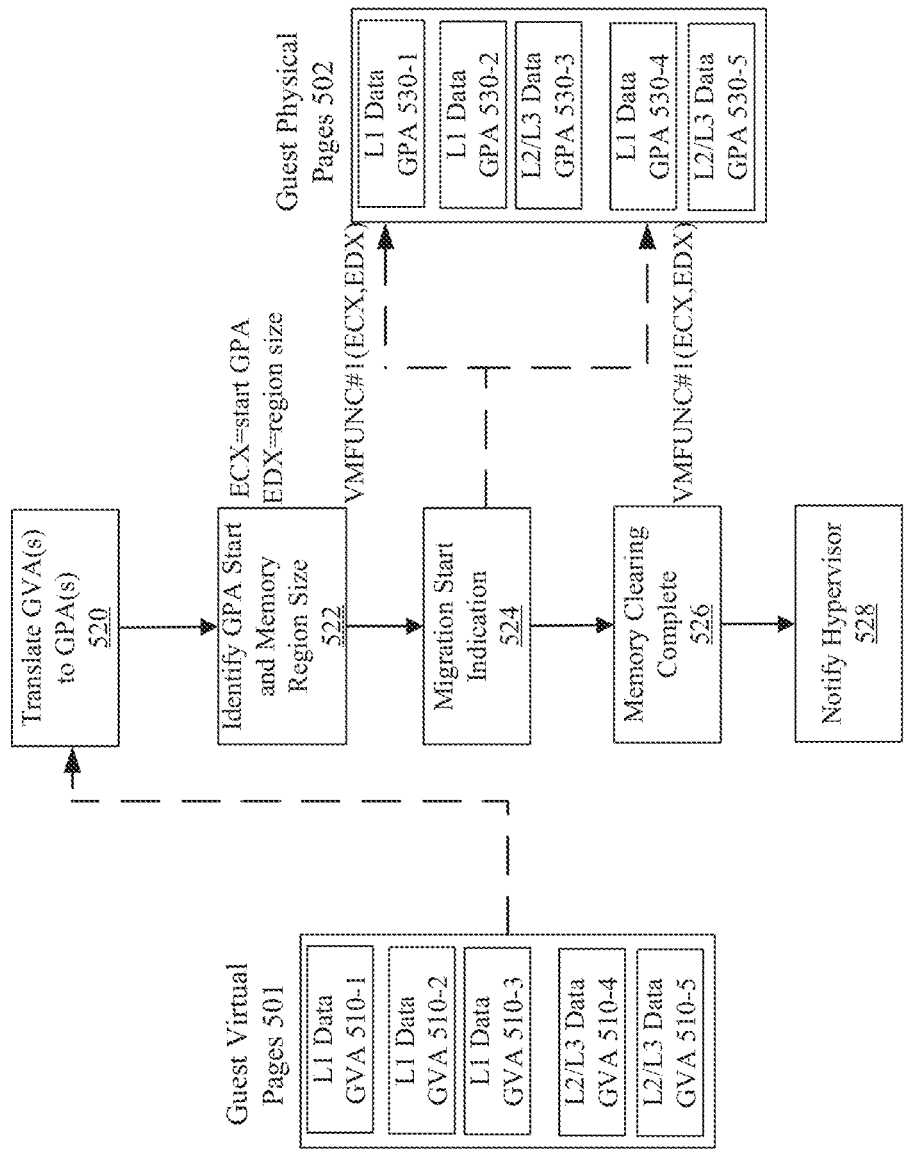
FIG. 5 illustrates an example second scheme.

FIG. 5 illustrates an example scheme 500. Scheme 500 may depict an example when a VM may execute protocol stack applications associated with a radio access network (RAN). For example, the protocol stack applications may include Layer 1-3 (L1-L3) protocol processing applications. In some examples, the L1 protocol processing application may be used to process wireless baseband data resulting in many dirty pages in a relatively short period of time. The many dirty pages in the relative short period of time may make it difficult to enable enough data to be pre-copied to a destination host server to allow for a successful live migration (e.g., unable to reach convergence) of a VM executing the protocol stack application.

According to some examples, when the L1 protocol processing application starts up, the L1 protocol processing application may indicate to logic and/or features of a guest OS kernel (e.g., unused/free logic) what guest virtual pages 501 include or will include the L1 protocol processed wireless baseband data. For example, the L1 protocol processing application may indicate that L1 data is to be maintained at guest virtual addresses (GVAs) 510-1 to 510-3. For these examples, the L1 data at these GVAs may be deemed as unused and does not need to be copied during a live migration because dirty pages associated with upper protocol stack layers L2 and L3 may be used to recover L1 data. Dirty pages associated with L2 and L3, for example, included in GVAs 510-4 and/or 510-5 may be able to recover L1 data included in GVAs 510-1, 510-2 or 510-3 through retransmission mechanisms such as, but not limited to, hybrid automatic repeat request (HARQ) retransmission mechanisms.

In some examples, at 520 of scheme 500, logic and/or features of the guest OS kernel (e.g., unused/free logic) may translate GVAs 510-1 to 510-3 to guest physical addresses (GPAs). Then at 522, the logic and/or features of the guest OS kernel may identify a GPA start and a memory region size of guest physical pages 502. As shown in FIG. 5, ECX=start GPA and EDX=region size. According to some examples, translated GVAs 510-1 to 510-3 may map to two separate, non-contiguous regions. For these examples, at 524, two separate X86 instructions for VMFUNC #1 may be invoked by logic and/or features of the guest OS kernel upon an indication of a start of a live migration of the VM (e.g., received from a hypervisor). As shown in FIG. 5, a first VMFUNC #1 is invoked for L1 data maintained in a memory region that includes GPAs 530-1 and 530-2 and a second VMFUNC #1 is invoked for L1 data maintained in another, noncontiguous memory region that includes GPA 530-4. As mentioned briefly above and described more below, VMFUNC #1 may be used to clear dirty flags in an EPT such that memory regions associated with these cleared dirty flags are not copied during live migration. At 526, the logic and/or features of the guest OS kernel may determine that all unused memory regions for the L1 data have been caused to be cleared via the two separate X86 instructions for VMFUNC #1 and thus memory clearing is complete. At 528, the logic and/or features of the guest OS kernel may notify the hypervisor the memory clearing is complete.

Figure 6:
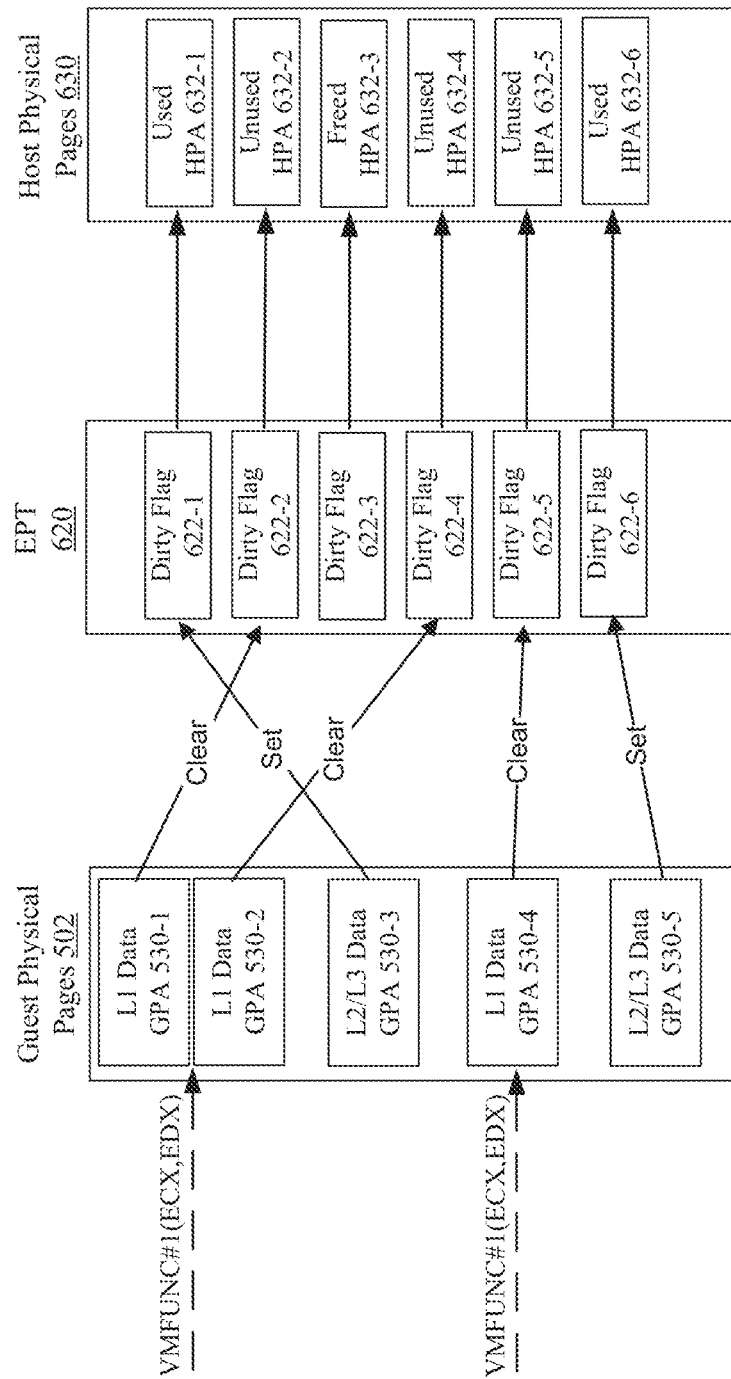
FIG. 6 illustrates an example third scheme.

FIG. 6 illustrates an example scheme 600. Scheme 600 may depict what occurs following an invoking of X86 instructions for VMFUNC #1 as mentioned above for scheme 500 as shown in FIG. 5. According some examples, guest physical pages 502 may include memory regions maintaining L1 and L2/L3 data. As mentioned previously for scheme 500, two separate X86 instructions for VMFUNC #1 may be invoked by logic and/or features of a guest OS kernel for a VM to be live migrated to a destination host server or node. As shown in FIG. 6, a first VMFUNC #1 goes to GPAs 530-1 and 530-2, while the second VMFUNC #1 goes to GPA 530-4.

According to some examples, EPT 620 may include dirty flags 622-1 to 622-6. Dirty flags 622-1 to 622-6 of EPT 620 may be mapped to both a given GPA and to a given HPA. For these examples, if a dirty flag is "set" then the HPA mapped to that set dirty flag is considered as "used" and will be copied during live migration of the VM to the destination host server or node. If a dirty flag is cleared or "clear" then the HPA mapped to that cleared dirty flag is considered as "unused" and will not be copied during live migration of the VM. Also, a dirty flag associated with a freed HPA may be a cleared dirty flag and may also not be copied during the live migration. Hence, HPAs identified as "used" are copied during the live migration and HPAs identified as "unused" or "freed" are not copied during the live migration. Set dirty flags mapped to HPAs of host physical pages 630 identified as "used" may be included in a dirty page bitmap that may be used by logic and/or features of a hypervisor (e.g., a migration manager) to quickly identify what host physical pages of host physical pages 630 are to be copied during the live migration.

In some examples, as shown in FIG. 6, the invoked VMFUNC #1 for GPAs 530-1 and 530-2 causes dirty flags 622-2 and 622-4 to be cleared and invoked VMFUNC #1 for GPA 530-3 causes dirty flag 622-5 to be cleared. Dirty flags 622-2, 622-4 and 622-5 map to respective HPAs 632-2, 632-3 and 632-5 which are each identified as "unused". Meanwhile, not invoking VMFUNC #1 for GPAs 530-3 and 530-5 causes respective dirty flags 622-1 and 622-6 to be set. Dirty flags 622-1 and 622-6 map to respective HPAs 632-1 and 622-6 which are each identified as "used".

Figure 7:
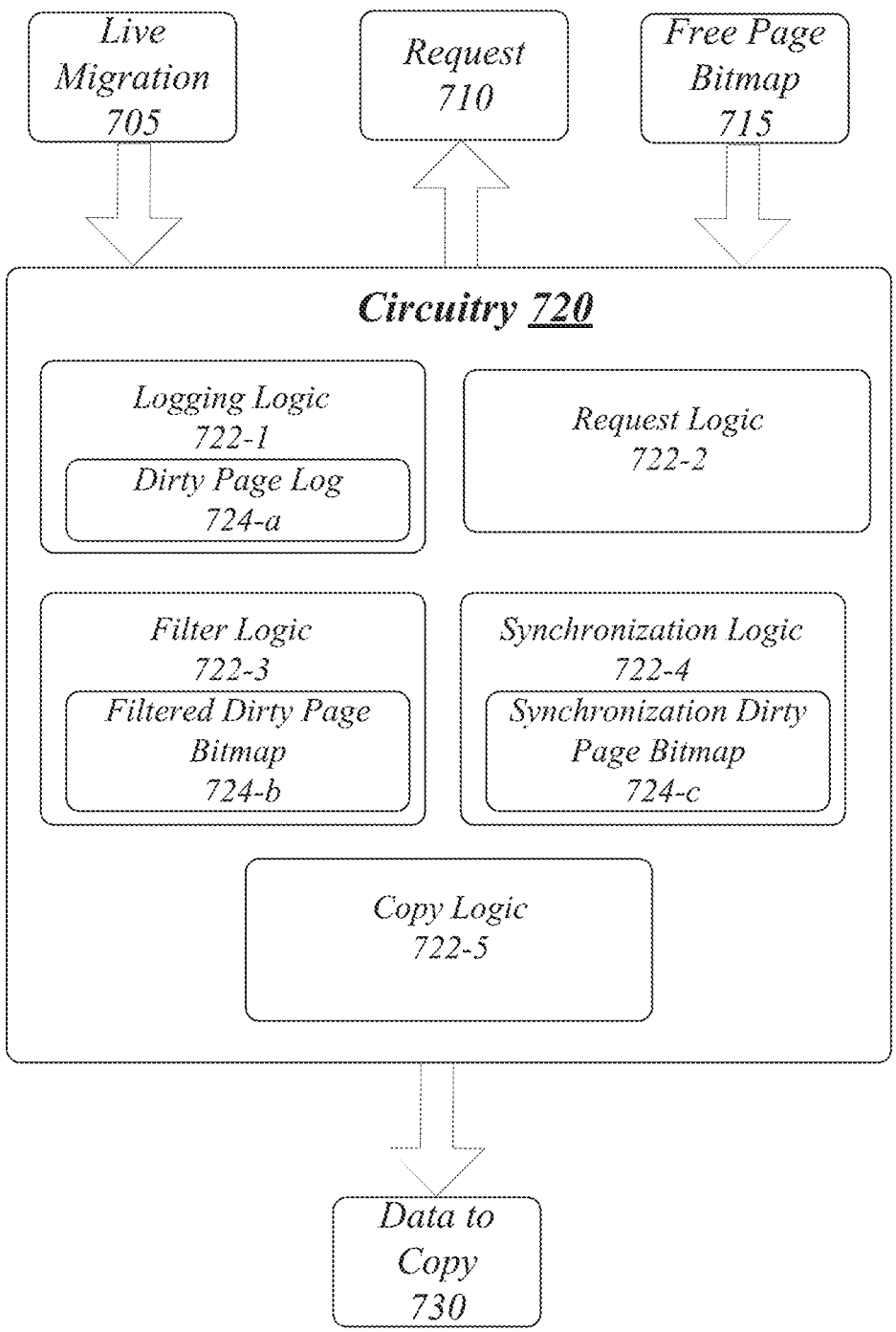
FIG. 7 illustrates an example block diagram for a first apparatus.

FIG. 7 illustrates an example block diagram for an apparatus 700. Although apparatus 700 shown in FIG. 7 has a limited number of elements in a certain topology, it may be appreciated that the apparatus 700 may include more or less elements in alternate topologies as desired for a given implementation.

According to some examples, apparatus 700 may be associated with a hypervisor, e.g., hypervisor 112 as shown in FIG. 1 and may be supported by circuitry 720. For these examples, circuitry 720 may be incorporated within a processor or CPU maintained at a server/node arranged to host a plurality of VMs that may be managed by the hypervisor associated with apparatus 700. Circuitry 720 may be arranged to execute one or more software, firmware or hardware implemented modules, components or logic 722-a (module, component or logic may be used interchangeably in this context). It is worthy to note that "a" and "b" and "c" and similar designators as used herein are intended to be variables representing any positive integer. Thus, for example, if an implementation sets a value for a=5, then a complete set software, firmware and/or hardware for logic 722-a may include logic 722-1, 722-2, 722-3, 722-4 or 722-5. The examples presented are not limited in this context and the different variables used throughout may represent the same or different integer values. Also, "logic", "module" or "component" may also include software/firmware stored in computer-readable media, and although the types of logic are shown in FIG. 7 as discrete boxes, this does not limit these components to storage in distinct computer-readable media components (e.g., a separate memory, etc.).

According to some examples, circuitry 720 may include a processor, processor circuit or processor circuitry. Circuitry 720 may be generally arranged to execute or implement one or more modules, components or logic 722-a. Circuitry 720 may be all or at least a portion of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also include an application specific integrated circuit (ASIC) and at least some logic 722-a may be implemented as hardware elements of the ASIC. According to some examples, circuitry 720 may also include a field programmable gate array (FPGA) and at least some logic 722-a may be implemented as hardware elements of the FPGA.

According to some examples, apparatus 700 may include logging logic 722-1. Logging logic 722-1 may be executed or implemented by circuitry 720 to start dirty page logging responsive to initiation of a live migration of a VM from among the plurality of VMs managed by the hypervisor associated with apparatus 700. For these examples, the live migration may be to a second host server. The dirty page logging may be maintained by logging logic in dirty page log 724-a (e.g., stored in a lookup table) and may be started to track what memory pages for memory allocated to the VM for execution of one or more applications become dirty while determining what data is to be copied from the memory allocated to the VM for completion of the live migration. Live migration indication 705 may indicate the initiation of the live migration of the VM.

In some examples, apparatus 700 may include request logic 722-2. Request logic 722-2 may be executed or implemented by circuitry 720 to send a request to the VM for the VM to construct a free page bitmap that identifies which memory pages of the memory pages for memory allocated to the VM have become free following initiation of the live migration. For these examples, request 710 may include the request sent to the VM.

According to some examples, apparatus 700 may include filter logic 722-3. Filter logic 722-3 may be executed or implemented by circuitry 720 to receive the free page bitmap and filter out freed memory pages from a dirty page bitmap that identifies the data to be copied from the memory allocated to the VM for completion of the live migration. For these examples, free page bitmap 715 may include the received free page bit map. Also, filter logic 722-3 may maintain a filtered dirty page bitmap 724-b (e.g., in a lookup table) that includes the results of filter logic 722-3 filtering of the dirty page bitmap.

In some examples, apparatus 700 may include synchronization logic 722-4. Synchronization logic 722-4 may be executed or implemented by circuitry 720 to synchronize the dirty page bitmap with the dirty page logging to determine the data to copy from the memory allocated to the VM to complete the live migration. For these examples, synchronization logic 722-4 may maintain a synchronized dirty page bitmap 724-c (e.g., in a lookup table) that includes the results of the synchronizing the dirty page bitmap with the dirty page logging maintained in dirty page log 724-a.

According to some examples, apparatus 700 may include copy logic 722-5. Copy logic 722-5 may be executed or implemented by circuitry 720 to copy the data for transmission to the second host server over a network connection between the first host server and the second host server. For these examples, data to copy 730 may include data identified in the synchronized dirty page bitmap for copying during the live migration of the VM.

Various components of apparatus 700 and a server or node implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a logic flow 800. Logic flow 800 may be representative of some or all of the operations executed by one or more logic, features, or devices described herein, such as apparatus 700. More particularly, logic flow 800 may be implemented by at least logging logic 722-1, request logic 722-2, filter logic 722-3 or synchronization logic 722-4.

According to some examples, logic flow 800 at block 802 may start dirty page logging responsive to initiation of a live migration of a VM supported by a first host server to a second host server, the dirty page logging started to track what memory pages for memory allocated to the VM for execution of one or more applications become dirty while determining what data is to be copied from the memory allocated to the VM for completion of the live migration. For these examples, logging logic 722-1 may start the dirty page logging.

In some examples, logic flow 800 at block 804 may send a request to the VM for the VM to construct a free page bitmap that identifies which memory pages of the memory pages for memory allocated to the VM have become free following initiation of the live migration. For these examples, request logic 722-2 may send the request.

According to some examples, logic flow 800 at block 806 may receive the free page bitmap and filtering out freed memory pages from a dirty page bitmap that identifies the data to be copied from the memory allocated to the VM for completion of the live migration. For these examples, filter logic 722-3 may receive the free page bitmap.

In some examples, logic flow 800 at block 808 may synchronize the dirty page bitmap with the dirty page logging to determine the data to copy from the memory allocated to the VM to complete the live migration. For these examples synchronization logic 722-4 may synchronize the dirty page bitmap.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
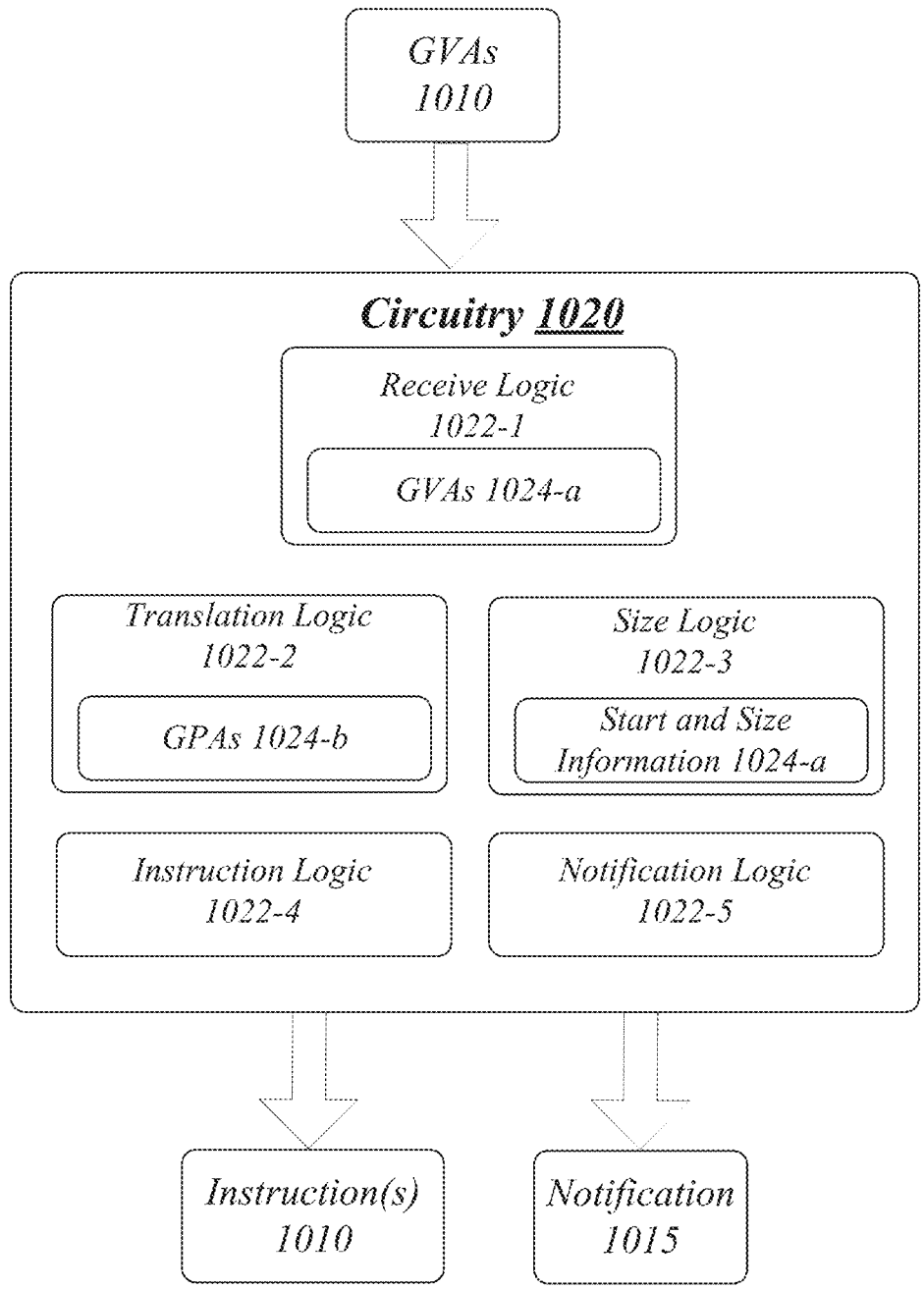
FIG. 10 illustrates an example block diagram for a second apparatus.

FIG. 10 illustrates an example block diagram for an apparatus 1000. Although apparatus 1000 shown in FIG. 10 has a limited number of elements in a certain topology, it may be appreciated that the apparatus 1000 may include more or less elements in alternate topologies as desired for a given implementation.

According to some examples, apparatus 1000 may be associated with a logic and/or features of guest OS kernel for a VM, e.g., unused/free logic 123 of guest OS kernel 121 of VM 120 as shown in FIG. 1. Apparatus 1000 may be supported by circuitry 1020. For these examples, circuitry 1020 may be incorporated within a processor or CPU maintained at a server/node arranged to host a plurality of VMs that may be managed by a hypervisor in communication with the logic and/or features of the guest OS kernel associated with apparatus 1000. Circuitry 1020 may be arranged to execute one or more software, firmware or hardware implemented modules, components or logic 1022-*a* (module, component or logic may be used interchangeably in this context). It is worthy to note that "a" and "b" and "c" and similar designators as used herein are intended to be variables representing any positive integer. Thus, for example, if an implementation sets a value for a=5, then a complete set software, firmware and/or hardware for logic 1022-*a* may include logic 1022-1, 1022-2, 1022-3, 1022-4 or 1022-5. The examples presented are not limited in this context and the different variables used throughout may represent the same or different integer values. Also, "logic", "module" or "component" may also include software/firmware stored in computer-readable media, and although the types of logic are shown in FIG. 10 as discrete boxes, this does not limit these components to storage in distinct computer-readable media components (e.g., a separate memory, etc.).

According to some examples, circuitry 1020 may include a processor, processor circuit or processor circuitry. Circuitry 1020 may be generally arranged to execute or implement one or more modules, components or logic 1022-*a*. Circuitry 1020 may be all or at least a portion of any of various commercially available processors to include but not limited to the processors mentioned above for apparatus 1000. Also, according to some examples, circuitry 1020 may also be an ASIC and at least some logic 1022-*a* may be implemented as hardware elements of the ASIC. According to some examples, circuitry 1020 may also include an FPGA and at least some logic 1022-*a* may be implemented as hardware elements of the FPGA.

In some examples, apparatus 1000 may include receive logic 1022-1. Receive logic 1022-1 may be executed or implemented by circuitry 1020 to receive one or more GVAs for storing data associated with execution of an application by a VM supported by a first host server that may include apparatus 1000. The data may be stored to the one or more GVAs identified as data not to be copied during live migration of the VM to a second host server. For these examples, the GVAs may be included in GVAs 1005 and may be at temporally maintained by receive logic 1022-1 in GVAs 1024-*a* (e.g., in a lookup table).

According to some examples, apparatus 1000 may include translation logic 1022-2. Translation logic 1022-2 may be executed or implemented by circuitry 1020 to translate the one or more GVAs to respective one or more GPAs for memory allocated to the VM. For these examples, the GPAs may be at least temporarily maintained by translation logic in GPAs 1024-*b* (e.g., in a lookup table).

In some examples, apparatus 1000 may include size logic 1022-3. Size logic 1022-3 may be executed or implemented by circuitry 1020 to determine a GPA start address and memory region size for the one or more GPAs. For these examples, the GPA start address and memory region size may be at least temporarily maintained by size logic 1022-3 in start and size information 1024-*c* (e.g., in a lookup table).

According to some examples, apparatus 1000 may include instruction logic 1022-4. Instruction logic 1022-4 may be executed or implemented by circuitry 1020 to invoke an instruction that includes the GPA start address and memory region size responsive to receiving an indication of a start of the live migration of the VM to the second host server, the instruction to cause one or more dirty flags of an extended page table that maps the one or more GPAs to corresponding one or more HPAs to be cleared such that data stored at the corresponding HPAs is not copied during the live migration. For these examples, instruction 1010 may include the instruction evoked by instruction logic 1022-4 to cause the one or more dirty flags to be cleared.

In some examples, apparatus 1000 may include a notification logic 1022-5. Notification logic 1022-5 may be executed or implemented by circuitry 1020 to notify a hypervisor that the instruction to cause the one or more dirty flags to be cleared has been invoked, the hypervisor to cause the data stored at the corresponding HPAs to not be copied during the live migration. For these examples, the hypervisor may be configured to manage the VM and other VMs supported by the first host server. The notification may be included in notification 1015.

Various components of apparatus 1000 and a server or node implementing apparatus 1000 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 11 illustrates an example of a logic flow 1100. Logic flow 1100 may be representative of some or all of the operations executed by one or more logic, features, or devices described herein, such as apparatus 1000. More particularly, logic flow 1100 may be implemented by at least receive logic 1022-1, translation logic 1022-2, size logic 1022-3 or instruction logic 1022-4.

According to some examples, logic flow 1100 at block 1102 may receive one or more GVAs for storing data associated with execution of an application by a VM supported by a first host server, the data stored to the one or more GVAs identified as data not to be copied during live migration of the VM to a second host server. For these examples, receive logic 1022-1 may receive the one or more GVAs.

In some examples, logic flow 1100 at block 1104 may translate the one or more GVAs to respective one or more GPAs for memory allocated to the VM. For these examples, translation logic 1022-2 may translate the one or more GVAs.

According to some examples, logic flow 1100 at block 1106 may determine a GPA start address and memory region size for the one or more GPAs. For these examples, size logic 1022-3 may make this determination.

In some examples, logic flow 1100 at block 1108 may invoke an instruction that includes the GPA start address and memory region size responsive to receiving an indication of a start of the live migration of the VM to the second host server, the instruction to cause one or more dirty flags of an extended page table that maps the one or more GPAs to corresponding one or more HPAs to be cleared such that data stored at the corresponding HPAs is not copied during the live migration. For these examples, instruction logic 1022-4 may invoke the instruction.

FIG. 12 illustrates an example of a storage medium 1200. Storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
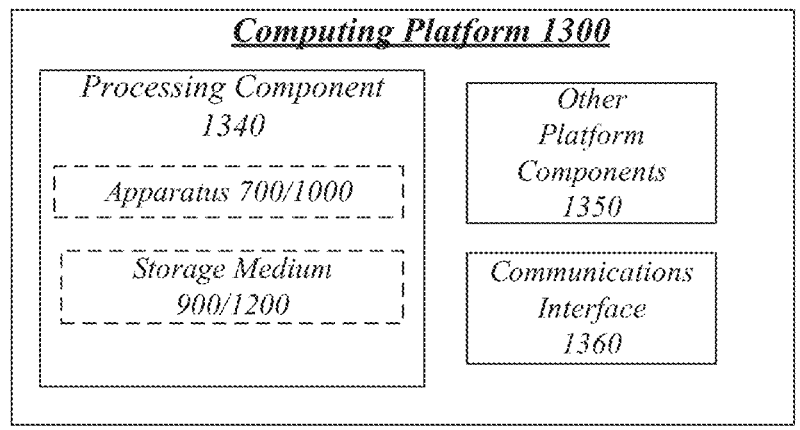
FIG. 13 illustrates an example computing platform.

FIG. 13 illustrates an example computing platform 1300. In some examples, as shown in FIG. 13, computing platform 1300 may include a processing component 1340, other platform components 1350 or a communications interface 1360. According to some examples, computing platform 1300 may be implemented in a node/server. The node/server may be capable of coupling through a network to other nodes/servers and may be part of data center including a plurality of network connected nodes/servers arranged to host VMs.

According to some examples, processing component 1340 may execute processing operations or logic for apparatus 700/1000 and/or storage medium 900/1200. Processing component 1340 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1350 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), other types of non-volatile types of memory such as 3-D cross-point memory that may be byte or block addressable. These byte or block addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM). Other types of computer readable and machine readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1360 may include logic and/or features to support a communication interface. For these examples, communications interface 1360 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1300 may be implemented in a server/node of a data center. Accordingly, functions and/or specific configurations of computing platform 1300 described herein, may be included or omitted in various embodiments of computing platform 1300, as suitably desired for a server/node.

The components and features of computing platform 1300 may be implemented using any combination of discrete circuitry, application specific integrated circuits (ASICs), logic gates and/or single chip architectures. Further, the features of computing platform 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. An example apparatus may include circuitry for a first host server arranged to host a plurality of VMs. The apparatus may also include receive logic for execution by the circuitry to receive one or more GVAs for storing data associated with execution of an application by a VM from among the plurality of VMs supported by the first host server. The data to the one or more GVAs may be identified as data not to be copied during live migration of the VM to a second host server. The apparatus may also include translation logic for execution by the circuitry to translate the one or more GVAs to respective one or more GPAs for memory allocated to the VM. The apparatus may also include size logic for execution by the circuitry to determine a GPA start address and memory region size for the one or more GPAs. The apparatus may also include instruction logic for execution by the circuitry to invoke an instruction that includes the GPA start address and memory region size responsive to receiving an indication of a start of the live migration of the VM to the second host server. The instruction may cause one or more dirty flags of an extended page table that maps the one or more GPAs to corresponding one or more HPAs to be cleared such that data stored at the corresponding HPAs is not copied during the live migration.

Example 2. The apparatus of example 1 may also include notification logic for execution by the circuitry to notify a hypervisor that the instruction to cause the one or more dirty flags to be cleared has been invoked, the hypervisor to cause the data stored at the corresponding HPAs to not be copied during the live migration.

Example 3. The apparatus of example 1, the hypervisor to cause the data stored at the corresponding HPAs to not be copied during the live migration is to cause removal of the HPAs from a dirty page bitmap from which data stored to the memory allocated to the VM is selected for copying during the live migration.

Example 4. The apparatus of example 3, the data stored to the memory allocated to the VM is selected to be copied during the live migration to enable transmission of the copied data to the second host server over a network connection between the first host server and the second host server.

Example 5. The apparatus of example 1, the application may include a protocol stack application associated with a radio access network for layer 1, layer 2 or layer 3 protocol processing.

Example 6. The apparatus of example 5, the data stored to the one or more GVAs identified as data not to be copied during the live migration may include data generated by the protocol stack application during layer 1 protocol processing.

Example 7. The apparatus of example 1, the instruction invoked by the instruction logic may be an X86 instruction for VMFUNC #1.

Example 8. The apparatus of example 1 may also include a digital display coupled to the circuitry to present a user interface view.

Example 9. An example method may include receiving, at a processor circuit, one or more GVAs for storing data associated with execution of an application by a VM supported by a first host server. The data stored to the one or more GVAs may be identified as data not to be copied during live migration of the VM to a second host server. The method may also include translating the one or more GVAs to respective one or more GPAs for memory allocated to the VM. The method may also include determining a GPA start address and memory region size for the one or more GPAs. The method may also include invoking an instruction that includes the GPA start address and memory region size responsive to receiving an indication of a start of the live migration of the VM to the second host server. The instruction may cause one or more dirty flags of an extended page table that maps the one or more GPAs to corresponding one or more HPAs to be cleared such that data stored at the corresponding HPAs is not copied during the live migration.

Example 10. The method of example 9 may also include notifying a hypervisor that the instruction to cause the one or more dirty flags to be cleared has been invoked, the hypervisor to cause the data stored at the corresponding HPAs to not be copied during the live migration.

Example 11. The method of example 10, the hypervisor to cause the data stored at the corresponding HPAs to not be copied during the live migration may include the hypervisor removing the HPAs from a dirty page bitmap from which data stored to the memory allocated to the VM is selected for copying during the live migration.

Example 12. The method of example 11, the data stored to the memory allocated to the VM may be selected for copying during the live migration to transmit the copied data to the second host server over a network connection between the first host server and the second host server.

Example 13. The method of example 9, the application may be a protocol stack application associated with a radio access network for layer 1, layer 2 or layer 3 protocol processing.

Example 14. The method of example 13, the data stored to the one or more GVAs identified as data not to be copied during the live migration may include data generated by the protocol stack application during layer 1 protocol processing.

Example 15. The method of example 9, the invoked instruction may be an X86 instruction for VMFUNC #1.

Example 16. The method of example 9, the method may be implemented by a guest operating system kernel for the VM.

Example 17. An example at least one machine readable medium may include a plurality of instructions that in response to being executed by a system may cause the system to carry out a method according to any one of examples 9 to 16.

Example 18. An example apparatus may include means for performing the methods of any one of examples 9 to 16.

Example 19. An example at least one machine readable medium may include a plurality of instructions that in response to being executed by a system at a first host server may cause the system to receive one or more GVAs for storing data associated with execution of an application by a VM supported by the first host server. The data may be stored to the one or more GVAs identified as data not to be copied during live migration of the VM to a second host server. The instructions may also cause the system to translate the one or more GVAs to respective one or more GPAs for memory allocated to the VM. The instructions may also cause the system to determine a GPA start address and memory region size for the one or more GPAs. The instructions may also cause the system to invoke an instruction that includes the GPA start address and memory region size responsive to receipt of an indication of a start of the live migration of the VM to the second host server. The instruction may cause one or more dirty flags of an extended page table that maps the one or more GPAs to corresponding one or more HPAs to be cleared such that data stored at the corresponding HPAs is not copied during the live migration.

Example 20. The at least one machine readable medium of example 19, the instructions may further cause the system to notify a hypervisor that the instruction to cause the one or more dirty flags to be cleared has been invoked. The hypervisor may cause the data stored at the corresponding HPAs to not be copied during the live migration.

Example 21. The at least one machine readable medium of example 20, the hypervisor to cause the data stored at the corresponding HPAs to not be copied during the live migration may include the hypervisor to remove the HPAs from a dirty page bitmap from which data stored to the memory allocated to the VM is selected to be copied during the live migration.

Example 22. The at least one machine readable medium of example 21, the data stored to the memory allocated to the VM may be selected to be copied during the live migration to enable transmission of the copied data to the second host server over a network connection between the first host server and the second host server.

Example 23. The at least one machine readable medium of example 19, the application may be a protocol stack application associated with a radio access network for layer 1, layer 2 or layer 3 protocol processing.

Example 24. The at least one machine readable medium of example 23, the data stored to the one or more GVAs identified as data not to be copied during the live migration may include data generated by the protocol stack application during layer 1 protocol processing.

Example 25. The at least one machine readable medium of example 19, the invoked instruction may be an X86 instruction for VMFUNC #1.

Example 26. The at least one machine readable medium of example 19, the system at the first host server may be a guest operating system kernel for the VM.

Example 27. An example apparatus may include circuitry for a first host server arranged to host a plurality of VMs. The apparatus may also include logging logic for execution by the circuitry to start dirty page logging responsive to initiation of a live migration of a VM from among the plurality of VMs. The live migration may be to a second host server. The dirty page logging may be started to track what memory pages for memory allocated to the VM for execution of one or more applications become dirty while determining what data is to be copied from the memory allocated to the VM for completion of the live migration. The apparatus may also include request logic for execution by the circuitry to send a request to the VM for the VM to construct a free page bitmap that identifies which memory pages of the memory pages for memory allocated to the VM have become free following initiation of the live migration. The apparatus may also include filter logic for execution by the circuitry to receive the free page bitmap and filter out freed memory pages from a dirty page bitmap that identifies the data to be copied from the memory allocated to the VM for completion of the live migration. The apparatus may also include synchronization logic for execution by the circuitry to synchronize the dirty page bitmap with the dirty page logging to determine the data to copy from the memory allocated to the VM to complete the live migration.

Example 28. The apparatus of example 27 may also include copy logic for execution by the circuitry to copy the data for transmission to the second host server over a network connection between the first host server and the second host server.

Example 29. The apparatus of example 27, the logging logic, the request logic, the filter logic, and the synchronization logic may be implemented by a hypervisor or VMM configured to manage the plurality of VMs.

Example 30. The apparatus of example 27, the request logic may send the request to a guest OS kernel for the VM. The guest OS kernel may construct the free page bitmap.

Example 31. An example method may include starting, at a processor circuit, dirty page logging responsive to initiation of a live migration of a VM supported by a first host server to a second host server. The dirty page logging may be started to track what memory pages for memory allocated to the VM for execution of one or more applications become dirty while determining what data is to be copied from the memory allocated to the VM for completion of the live migration. The method may also include sending a request to the VM for the VM to construct a free page bitmap that identifies which memory pages of the memory pages for memory allocated to the VM have become free following initiation of the live migration. The method may also include receiving the free page bitmap and filtering out freed memory pages from a dirty page bitmap that identifies the data to be copied from the memory allocated to the VM for completion of the live migration. The method may also include synchronizing the dirty page bitmap with the dirty page logging to determine the data to copy from the memory allocated to the VM to complete the live migration.

Example 32. The method of example 31 may also include copying the data for transmission to the second host server over a network connection between the first host server and the second host server.

Example 33. The method of example 31 may also include the method being implemented by a hypervisor or VMM supported by the first host server.

Example 34. The method of example 31 may also include sending the request to a guest OS kernel for the VM. The guest OS kernel may construct the free page bitmap.

Example 35. An example at least one machine readable medium may include a plurality of instructions that in response to being executed by a system may cause the system to carry out a method according to any one of examples 31 to 34.

Example 36. An example apparatus may include means for performing the methods of any one of examples 31 to 34.

Example 37. An example at least one machine readable medium may include a plurality of instructions that in response to being executed by a system at a first host server may cause the system to start dirty page logging responsive to initiation of a live migration of a VM supported by the first host server. The live migration may be to a second host server. The dirty page logging may be started to track what memory pages for memory allocated to the VM for execution of one or more applications become dirty while determining what data is to be copied from the memory allocated to the VM for completion of the live migration. The instructions may also cause the system to send a request to the VM for the VM to construct a free page bitmap that identifies which memory pages of the memory pages for memory allocated to the VM have become free following initiation of the live migration. The instructions may also cause the system to receive the free page bitmap and filter out freed memory pages from a dirty page bitmap that identifies the data to be copied from the memory allocated to the VM for completion of the live migration. The instructions may also cause the system to synchronize the dirty page bitmap with the dirty page logging to determine the data to copy from the memory allocated to the VM to complete the live migration.

Example 38. The at least one machine readable medium of example 37, the instructions may further cause the system to copy the data for transmission to the second host server over a network connection between the first host server and the second host server.

Example 39. The at least one machine readable medium of example 37, the system at the first host server may be a hypervisor or VMM supported by the first host server.

Example 40. The at least one machine readable medium of example 37, the instructions may cause the system to send the request to a guest OS kernel for the VM. The guest OS kernel may construct the free page bitmap.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a first host server arranged to host a plurality of virtual machines (VMs), the circuitry to execute a guest operating system (OS) kernel for a VM from among the plurality of VMs, the guest OS kernel to:
   identify, during initiation of an application executing in the VM, one or more guest virtual addresses (GVAs) that are used for storing data, used by the application, that is not to be copied during a live migration of the VM to a second host server;
   translate the identified one or more GVAs to respective one or more guest physical addresses (GPAs) for memory allocated to the VM;
   determine a GPA start address and a memory region size of the one or more GPAs for the memory allocated to the VM; and invoke, responsive to an indication of a start of a live migration of the VM to the second host server, an instruction that includes the GPA start address and the memory region size for the memory allocated to the VM, the instruction to cause one or more dirty flags of an extended page table that maps the one or more GPAs to corresponding one or more host physical addresses (HPAs) to be cleared such that data stored at the corresponding one or more HPAs is not copied at all during the live migration.

2. The apparatus of claim 1, further comprising the guest OS kernel to:
notify a hypervisor that the instruction to cause the one or more dirty flags to be cleared has been invoked, the hypervisor to cause the data stored at the corresponding one or more HPAs to not be copied during the live migration.

3. The apparatus of claim 2, wherein the hypervisor to cause the data stored at the one or more corresponding HPAs to not be copied during the live migration includes the hypervisor to cause removal of the one or more corresponding HPAs from a dirty page bitmap that indicates what data is to be copied during the live migration, wherein the data to be copied is associated with execution of the application in the VM at the first host server.

4. The apparatus of claim 3, comprising the data to be copied during the live migration over a network connection between the first host server and the second host server.

5. The apparatus of claim 3, the application comprising a protocol stack application associated with a radio access network for layer 1, layer 2 or layer 3 protocol processing.

6. The apparatus of claim 5, comprising the data that is not to be copied during the live migration includes data generated by the protocol stack application during layer 1 protocol processing at the first host server.

7. The apparatus of claim 1, the invoked instruction comprises an X86 instruction for VMFUNC #1.

8. The apparatus of claim 1, comprising a digital display coupled to the circuitry to present a user interface view.

9. A method implemented by a guest operating system kernel for a virtual machine (VM), the method comprising:
identifying, during initiation of an application executing in the VM, one or more guest virtual addresses (GVAs) that are used for storing data, used by the application, that is not to be copied during a live migration of the VM, the live migration of the VM to be from a first host server to a second host server;
translating the identified one or more GVAs to respective one or more guest physical addresses (GPAs) for memory allocated to the VM;
determining a GPA start address and a memory region size of the one or more GPAs for the memory allocated to the VM; and
invoking an instruction that includes the GPA start address and the memory region size for the memory allocated to the VM responsive to receiving an indication of a start of the live migration of the VM to the second host server, the instruction to cause one or more dirty flags of an extended page table that maps the one or more GPAs to corresponding one or more host physical addresses (HPAs) to be cleared such that data stored at the corresponding one or more HPAs is not copied at all during the live migration.

10. The method of claim 9, further comprising:
notifying a hypervisor that the instruction to cause the one or more dirty flags to be cleared has been invoked, the hypervisor to cause the data stored at the corresponding one or more HPAs to not be copied during the live migration.

11. The method of claim 10, wherein the hypervisor to cause the data stored at the one or more corresponding HPAs to not be copied during the live migration includes the hypervisor to cause removal of the one or more corresponding HPAs from a dirty page bitmap that indicates what data is to be copied during the live migration, wherein the data to be copied is associated with execution of the application in the VM at the first host server.

12. The method of claim 11, comprising the data to be copied during the live migration over a network connection between the first host server and the second host server.

13. At least one non-transitory machine readable medium comprising a plurality of instructions that in response to being executed by a guest operating system (OS) kernel for a virtual machine (VM), cause the guest OS kernel to:
identify, during initiation of an application executing in the VM, one or more guest virtual addresses (GVAs) that are used for storing data, used by the application, that is not to be copied during a live migration of the VM, the live migration of the VM to be from a first host server to a second host server;
translate the identified one or more GVAs to respective one or more guest physical addresses (GPAs) for memory allocated to the VM;
determining a GPA start address and a memory region size of the one or more GPAs for the memory allocated to the VM; and
invoke an instruction that includes the GPA start address and the memory region size for the memory allocated to the VM responsive to receiving an indication of a start of the live migration of the VM to the second host server, the instruction to cause one or more dirty flags of an extended page table that maps the one or more GPAs to corresponding one or more host physical addresses (HPAs) to be cleared such that data stored at the corresponding one or more HPAs is not copied at all during the live migration.

14. The at least one non-transitory machine readable medium of claim 13, the instructions to further cause the guest OS kernel to:
notify a hypervisor that the instruction to cause the one or more dirty flags to be cleared has been invoked, the hypervisor to cause the data stored at the corresponding one or more HPAs to not be copied during the live migration.

15. The at least one non-transitory machine readable medium of claim 14, wherein the hypervisor to cause the data stored at the one or more corresponding HPAs to not be copied during the live migration includes the hypervisor to cause removal of the one or more corresponding HPAs from a dirty page bitmap that indicates what data is to be copied during the live migration, wherein the data to be copied is associated with of the application in the VM at the first host server.

16. The at least one non-transitory machine readable medium of claim 15, comprising the data to be copied during the live migration over a network connection between the first host server and the second host server.

17. The at least one non-transitory machine readable medium of claim 15, the application comprising a protocol stack application associated with a radio access network for layer 1, layer 2 or layer 3 protocol processing.

18. The at least one non-transitory machine readable medium of claim 17, comprising the data that is not to be copied during the live migration includes data generated by the protocol stack application during layer 1 protocol processing at the first host server.

19. The at least one non-transitory machine readable medium of claim 13, the invoked instruction comprising an X86 instruction for VMFUNC #1.

* * * * *